March 16, 1954   F. A. WAKEFIELD   2,672,344
COLOR COMBINATION GAME APPARATUS
Filed March 21, 1950   3 Sheets-Sheet 1

INVENTOR.
Fern A. Wakefield
BY
Cook and Schermerhorn
ATTORNEYS

March 16, 1954     F. A. WAKEFIELD     2,672,344
COLOR COMBINATION GAME APPARATUS
Filed March 21, 1950     3 Sheets-Sheet 2
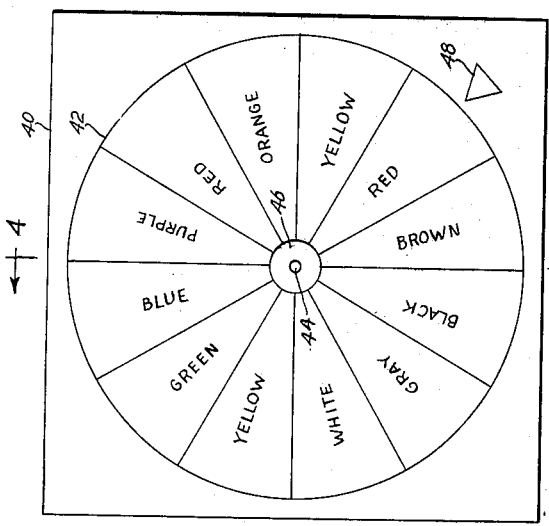
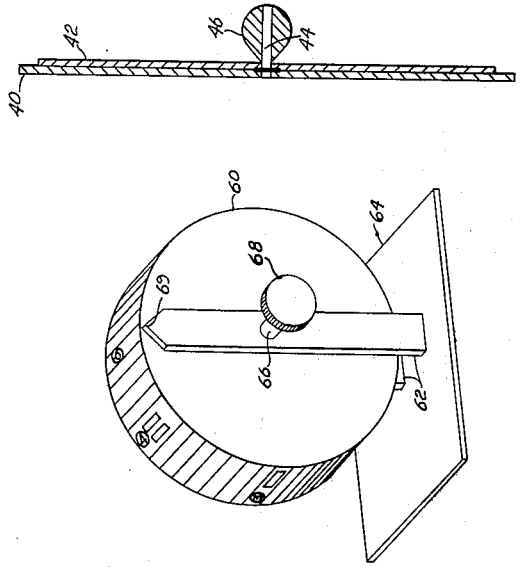
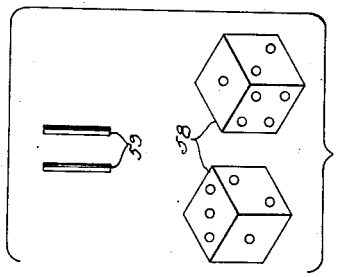
INVENTOR.
*Fern A. Wakefield*
BY
*Cook and Schermerhorn*
ATTORNEYS March 16, 1954     F. A. WAKEFIELD     2,672,344
COLOR COMBINATION GAME APPARATUS Filed March 21, 1950     3 Sheets-Sheet 3

INVENTOR.
*Fern A. Wakefield*
BY
*Cook and Schermerhorn*
ATTORNEYS

Patented Mar. 16, 1954

2,672,344

UNITED STATES PATENT OFFICE 2,672,344

COLOR COMBINATION GAME APPARATUS

Fern A. Wakefield, Portland, Oreg.

Application March 21, 1950, Serial No. 150,893

6 Claims. (Cl. 273—95)

This invention relates to an educational game for the teaching of color combinations. It is particularly designed for use of children. The complete game employs in cooperative combination three principal features as follows: (1) A plurality of areas representing different colors arranged in a common field; (2) means for selecting and compiling a list of colors from said field of colors; and (3) a scoring chart containing selected color combinations having assigned scoring values. Each of the three different features of the game may take different forms as will be hereinafter more fully disclosed. For example, the field may be of the board type, or be constituted by the surface of a rotating wheel or disc, or may be constituted by a board having apertures therein with each aperture representing a designated color. The means for selecting and compiling a list of colors may be a spinning pointer, dice, or may depend on a construction allowing for the exercise of skill, as in the exercise of marksmanship. The scoring chart may be imprinted on the board or it may be a separate printed card.

A general object of the invention is to devise a game based in principle on the making of secondary or more complex combinations of colors from the primary colors, red, yellow, and blue, and from the pseudo colors, black and white; or from secondary or other less complex colors than the ultimate combination color to be formed.

The term "basic color" is used herein to include the three primary colors, red, yellow and blue, and the pseudo colors, white and black. The term "secondary color" is used herein to define the combination of two of the three primary colors. The term "complex color" is used herein to define a combination color resulting from a combination of at least three basic colors.

It is another object to provide a field having marked thereon a plurality of main areas representing differentiating colors and a plurality of fractional areas representing differentiating colors, the colors of one or more of said fractional areas in cooperation with the colors of adjacent main areas constituting the color ingredients for a complex color.

It is yet another object of the invention to provide for use with means for compiling a list of colors, a chart or legend of selected color combinations which result in standard complex colors, and which are assigned scoring values more or less determined in proportion to the complexity of the color.

A further object is to provide a game employing in combination one of said fields and said scoring chart.

A still further object is to provide a number of variations for embodying the principles of the game above described.

Other objects, features, and advantages of the invention will become apparent from a study of the following specification, taken in connection with the accompanying drawings, wherein like reference characters designate corresponding parts throughout the several views; and wherein:

Figure 3 is a plan view of another embodiment showing a board with rotating disc mounted thereon;

Figure 4 is a sectional view taken on the line 4—4 of Figure 3;

Figure 6 is a plan view of a third embodiment showing a board with the colors arranged linearly;

Figure 7 is a collective view of the paraphernalia used for playing with the board shown in Figure 6;

Figure 9:
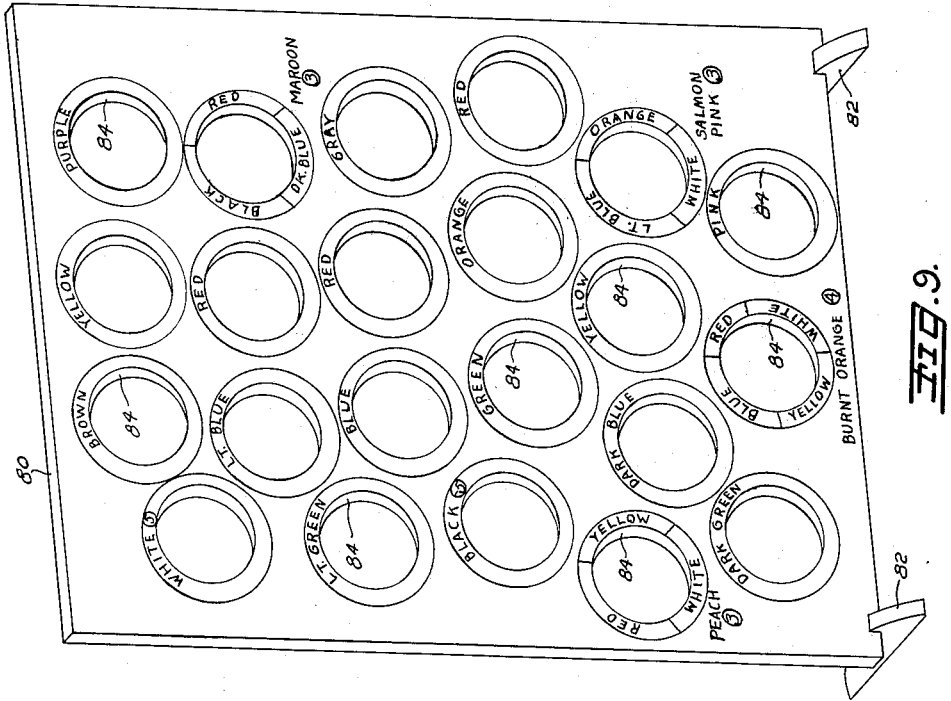

Figure 8 is a perspective view of a still different embodiment of the invention wherein the colors are arranged in a peripheral band on an upright rotating wheel; and Figure 9 is a perspective view of still another embodiment of the invention wherein an upright board constitutes the field, the color designated areas are randomly arranged, and each color designated area is provided with an aperture.

Figure 1:
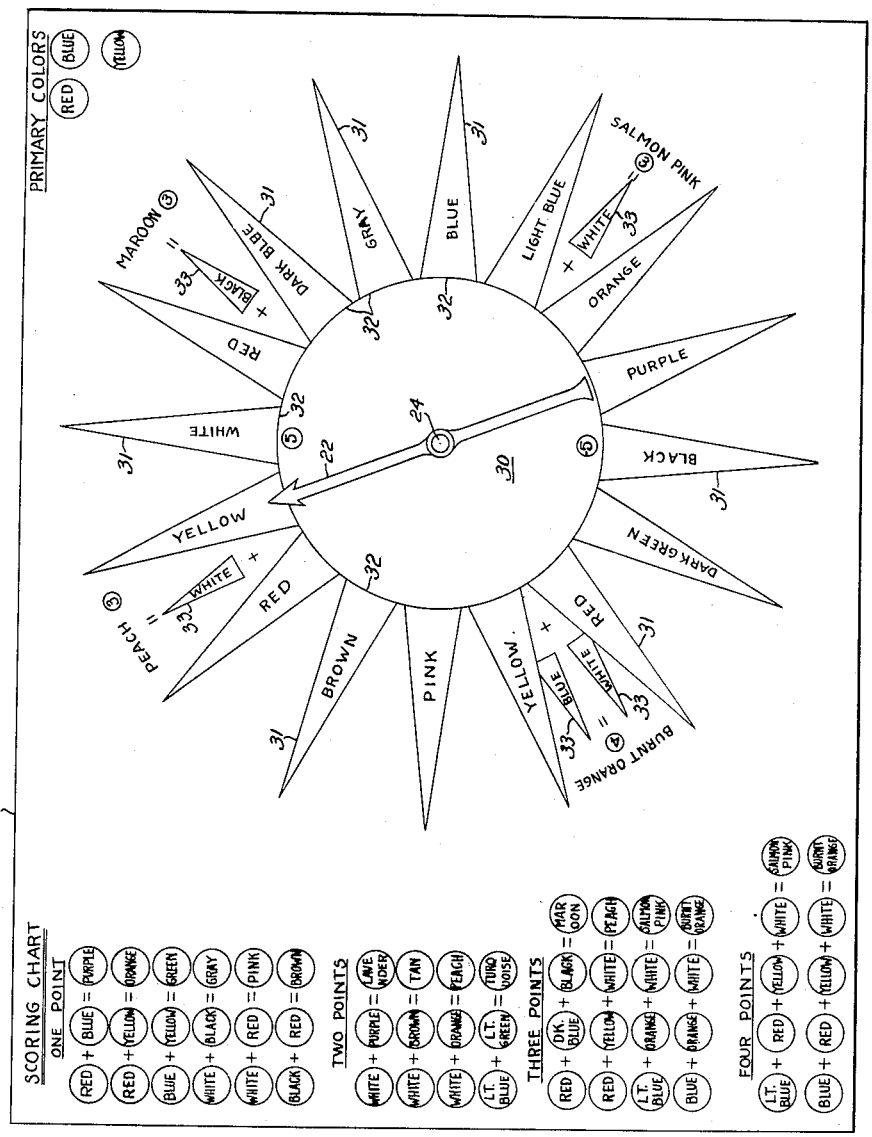
Figure 1 is a plan view of a playing board having alternating color areas and spaces circumferentially arranged in a star point design and having a color combination scoring legend on one margin of the board.
Figure 2:
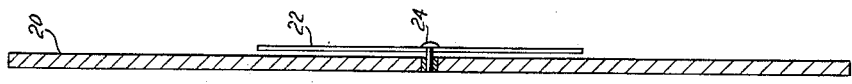
Figure 2 is a sectional view taken on the line 2—2 of Figure 1.

The game, as illustrated in Figures 1 and 2, which illustrate a preferred embodiment, comprises a board 20 having a design of circumferentially arranged alternating colored areas and spaces, with each adjacent colored area preferably being different from its neighbors. A pointer 22 is pivotally mounted at 24 centrally of the design.

It will be noted that the scoring chart or legend is provided therein on the left-hand margin of the board. The playing design, in the form illustrated in the drawing, will be seen to comprise a circular area 30, preferably of a neutral color, and a plurality of radially disposed star points 31 circumferentially arranged in equi-spaced relation about said circle having each of their bases 32 spaced from each other, and with the spacing between said points increasing in area as the radial distance increases.

Each of said points is designated to represent a color, preferably both by actual coloring and by the name of the color imprinted thereon. The standard shadings listed by the Rules of Practice to designate colors have not been used because no standard shading is listed for certain of the colors employed, and it was thought that the use of shading for some colors and not for all would confuse the understanding of the drawing. The colors, starting with blue at the middle right, are in clockwise rotation, blue, light blue, orange, purple, black, dark green, red, yellow, pink, brown, red, yellow, white, red, dark blue, and gray. The plain blue is intermediate between dark blue and light blue.

In the spaces between certain of the colored areas are disposed sub-star points 33 which are also designated to represent certain colors, both by actual coloring and lettering. For instance, in the spacing between red and yellow in the lower left-hand corner of the design are two sub-points colored white and blue, respectively; in the spacing between red and yellow in the upper left-hand corner of the design is a single sub-point, designated white; in the spacing between the points designated red and dark blue at the upper right-hand corner of the design is a single sub-point designated black; and in the spacing between the pointed areas designated light blue and orange at the lower right-hand corner of the design is a sub-point designated white. It will further be observed that the pair of adjacent pointed areas named in each case and the sub-points disposed in the spacing therebetween are a selected combination of colors which, when combined, results in a complex color. For instance, the combination of red, yellow, blue and white results in burnt orange, and this combination is so indicated in lettering at the periphery of the design. The combination of red, yellow and white results in the color "peach," and the combination is so indicated at the periphery of the design; the combination of red, blue and black results in maroon, and the combination is so indicated at the periphery; and the combination of light blue, orange and white results in salmon pink, and the color combination is so indicated at the periphery. The large figures shown encircled, for instance 5 at the base of the white star point, minus 5 (—5) at the base of the black star point, 4 in the burnt orange space area, and 3 at the peach, maroon and salmon pink spaces, are scoring points, as will be more fully hereinafter explained.

The pointer 22 is mounted on pin 24 so as to be free to spin upon impulse actuation by the finger of the player. It is constructed of a length so that its point extends well into the space between the colored areas. As hereinbefore mentioned, a part of the game comprises spinning the pointer and then noting the point in which it comes to rest. If it stops on a colored area, that color is listed by the player. If it stops in a space, nothing is noted unless it be one of the spaces having the sub-points disposed therein which are scoring spaces. It will be seen that the pointer, during the spinning thereof, will describe a circumferential locus passing over the alternating colored areas and spaces. Whether the pointer stops on a colored area or in an intermediate space is determined by the vertical projection of its tip on the board.

The color combination scoring chart illustrated at the left-hand margin of the board is reproduced herewith, as follows:

SCORING CHART

One point

Red+Blue=Purple
Red+Yellow=Orange
Blue+Yellow=Green
White+Black=Gray
White+Red=Pink
Black+Red=Brown

Two points

White+Purple=Lavender
White+Brown=Tan
White+Orange=Peach
Lt. Blue+Lt. Green=Turquoise

Three points

Dk. Red+Blue+Black=Maroon
Red+Yellow+White=Peach
Lt. Blue+Orange+White=Salmon Pink
Blue+Orange+White=Burnt Orange

Four Points

Lt. Blue+Red+Yellow+White=Salmon Pink
Blue+Red+Yellow+White=Burnt Orange

It will be seen that in the one point scoring group at the top of the list there is shown combinations of the three primary colors, the combination of white and black, and two representative combinations of white and black with a primary color. Next, there is arranged a selected group of four secondary colors in combination with either a primary color or white. These combinations are assigned a value of two points, as indicated. Then, there is next listed four selected combinations of three colors shown in the design, which are assigned a three point scoring value; and then, as a fourth and last group, two combinations of colors shown in the design are given which score four points. It will be noted that those combinations of colors which score four points are actually constituted by four basic colors, considering white and black as colors.

Principles involved in scoring chart

It will thus be observed that the simplest combinations of only two basic colors are rewarded with but one point score. The two point score value is assigned to combinations of two specific colors, but one of the two specific colors is a secondary color, so that actually three basic colors are involved in the combination, and, hence, the combination is rewarded by more than just one point. The scoring value of three is assigned, as illustrated, on the basis of employing three specific colors in the formation of a standard complex color, whether the three color ingredients are basic colors or combinations of basic colors and secondary colors, or even more complex colors. Similarly, the four point scoring values, as illustrated, are assigned on the basis of composing a standard complex color from four simpler colors. However, in the four point color combinations selected and illustrated, it also happens that each of the four different colors involved in each combination are basic colors.

Details of play

Having thus described the playing board and scoring chart, the method of play will next be de- lineated. The game is for any number of players; even one may play against par.

The players agree in advance as to how many points will constitute the game. 25 points is a good recommended number.

Each player then takes turns in play, each spinning the pointer in turn until each shall have spun it a prescribed number of times, for instance, ten times. As the pointer comes to rest after each spin, the player notes, either by the stroke of an appropriate colored crayon, or by writing, the colored area, if any, upon which the pointer stopped. If the pointer stopped in a space between colored areas, there is nothing to note except the number of the spin, unless the space was one of those designated burnt orange, peach, maroon, or salmon pink. If the pointer comes to rest in one of these spaces, or in the black, or white, colored area, the player immediately notes on his score record card (not shown) the number of points indicated on the design. It will be observed that the black area counts a minus five points. This scoring value is psychologically related to the fact that black makes all colors darker. As an attribute of the game, this feature provides the hazard element. On the other hand, the white area scores five points and is thereby psychologically related to the pleasant fact that white added to any other color makes it lighter. As an attribute of the game, this feature provides the "bull's-eye" or "jack pot" element.

After each of the players has taken his turn at spinning the pointer, and recorded his list of colors obtained, he will have a number of colors ranging from ten to zero, depending on whether the pointer has stopped on a color area each time or has failed to stop on a color area at any time. The player may also have a certain number of points, as determined by the times the pointer has stopped in one of the six scoring positions designated on the design.

The players are now ready for the second phase of the game, during which the player is called upon to exercise his skill in arranging the colors in his list into combinations which score the maximum number of points. To illustrate, if a player's list comprises red, yellow, blue and white, the player could combine these four colors into burnt orange and obtain a further score of four points. However, if the player failed to observe this possible combination and made merely the combinations of red and white for pink (one point) and blue and yellow for green (one point), he would score only two points from the use of the four colors. Again, if he should form the combinations of red and yellow, or of red and blue, he would receive only one point for such combination and would be unable to make any further score since the other two colors (blue and white left over from red and yellow, or yellow and white left over from red and blue) do not correspond to any of the predetermined combinations shown in the chart. However, if his list also included other colors, he might, of course, be able to match the two colors left over, for instance, blue and white, by matching the blue with another yellow in his list to make green for one point, and the white with brown in his list to make tan for two points. Even so, his score would not be as potentially large as if he had combined the first four colors, red, yellow, blue and white, into burnt orange for four points, because, while he would still make four points by the last group of combinations named, he would have used two more colors from his list in so doing. Otherwise, these two additional colors which he used might have been combined to score one or two points themselves, and would thereby have added to his score.

It will thereby be seen that the second phase of the game involves mental acumen and will inevitably result in an appreciation of the basic color ingredients which enter into standard, complex colors.

After the players have formulated their lists into color combinations and the corresponding scoring values for such combinations, the values obtained from the first phase of the play and the values obtained from the second phase of the play are totaled. If no player has the value required for game, the players each take another series of turns at spinning the pointer and repeat the play as before described until one player has attained the required score for game.

Figure 5:
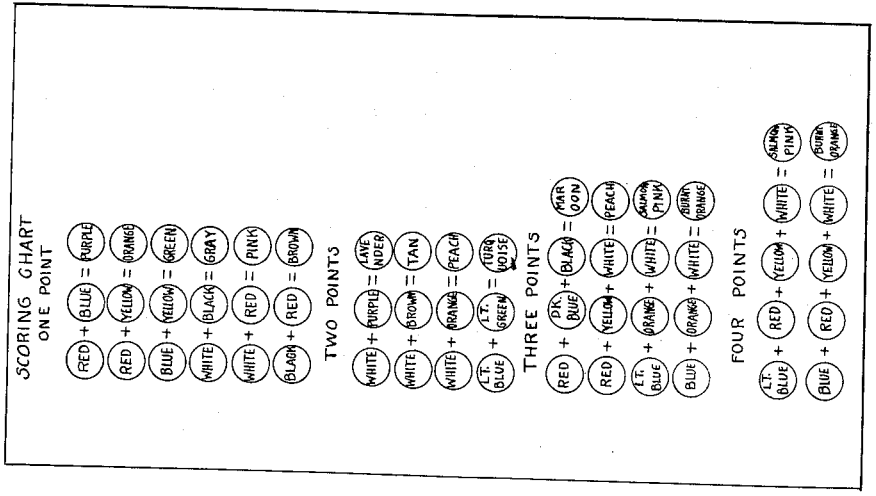
Figure 5 is a separate scoring chart which may be used with any of the game embodiments.

Detailed description of Figures 3, 4 and 5

Figures 3, 4 and 5 illustrate a simplified embodiment of the invention comprising a board 40 preferably of neutral or background color, and a disc 42 pivotally mounted centrally of the board by means of pin 44 (Figure 4) so as to be free to spin on the board. The disc is also provided with a knob 46 to facilitate spinning the same. The disc comprises a plurality of circumferentially arranged colored sectors. No particular number of sectors is prescribed, but it is preferred that at least each one of the basic colors be represented at least once. It is additionally preferred that the secondary colors, orange, green and purple, be included, and the pseudo-secondary color, gray, which results from the combination of black and white. Each of these colors is shown in the disc 42 illustrated in Figure 3, and also the color brown, which results from the combination of black and red. Again, there is no particular requirement as to the order or sequence in which the colored sectors are arranged, but it is suggested that improved educational results will be obtained by arranging the colors more or less as shown, where each of the primary colors and the pseudo colors, white and black, are separated from each other by at least one intervening sector, and that intervening sector is designated by the color which results when the adjacent basic colors are combined. An index point or marker 48 is provided at a fixed point on the board, and selects the color of the sector of the disc which aligns itself with the index point when the disc comes to rest.

Play with this device will proceed in substantially the same manner as with the form of the game illustrated in Figures 1 and 2. The same scoring chart may be used, although in this case it is preferred to provide it as a separate card or board, as illustrated in Figure 5. Incidentally, the scoring chart shown in Figure 5, which, as illustrated, is identical with the scoring chart on the board in Figure 1, will be referred to herein as the Scoring Chart for use with all the subsequently described embodiments. The score chart shown in Figure 5 may likewise be used with Figure 1 in lieu of showing a chart on the board. Obviously, a separate chart has advantages and disadvantages. It may get lost. But it may also be more readily consulted by one player while another is spinning the pointer, disc, or other apparatus used in playing the game.

Although no scoring values are indicated on any of the sectors on disc 42, scoring values may be assigned to particular sectors, if desired, in the manner of the values assigned to points and spaces in Figure 1, or otherwise. This is a matter of preference with the designer of the game.

The method of play will be substantially the same as that described for Figures 1 and 2, and may be readily adapted therefrom without further description. It will be observed that there is lacking in the game illustrated in Figure 3 the provision of spaces between the colored areas and the provision for sub-points, or, in this case, sub-sectors. The omission of these features provides greater simplification for the game in Figure 3, and thereby suggests the use of the game illustrated in Figure 3 for the youngest class of players. The game illustrated in Figure 3 has the additional obvious advantage that, since lacking spaces, every spin of the disc will produce a color selection. In other words, there will be no blank spaces or abortive results, and with ten spins, a list of ten colors will be obtained. This game also has the advantage of providing the colored areas in motion, resulting in their blending to a neutral color on spinning of the disc, thereby providing the fascination of motion to the child and the educational teaching of this phenomenon.

Figures 6 and 7 illustrate a third embodiment of the invention, in which the same sequential arrangement of colored areas and spaces as is provided in Figure 1 is spread out linearly on a board 50. The sub-points are here arranged as fractional areas or bars of color disclosed in wider spaces than the space area normally existing between adjacent colored areas. The same scoring values are assigned to the same colors and areas as assigned in Figure 1. There is further provided in this board the feature of teaching the players how to count. Each of the colored areas and spaces is numbered in sequence in a strip 52 at one edge of the board. Then there is further provided adjacent the edge of the board a strip 54 containing a series of pin holes 56, one for each colored area and space.

Suggested paraphernalia for providing the selection of colors for the compilation of the list are the dice 58 and the pair of pins 59 illustrated in Figure 7. There may, of course, be as many pairs of pins as players, in which case each pair of pins is differently colored. However, in following a plan of play whereby each player takes all ten throws of the dice as one turn of play, one pair of pins would be sufficient.

Play then proceeds as follows: Each player, in turn, rolls the dice and places his first pin in the numbered hole corresponding to the number shown by the dice. At the same time, he observes the color indicated and notes it on his list, and, if it provides a score value, also records the score value. Then the player rolls the dice again and counts forward from the pin in position the number of holes corresponding to the number shown by the dice, where he places the second pin. It will be noticed that this feature of the game resembles cribbage. The player then again repeats the color notation and scoring system. This continues for ten throws of the dice. When the player reaches the right-hand end of the board at number 33, he obviously starts over, beginning back at the left-hand end of the board, and may either start a fresh count or may continue counting from the last position of the pin at the right-hand end of the board, depending on the rule provided. If each player does not take all ten throws of the dice in succession, but only one throw, and then another player takes his turn, it will be necessary, of course, to provide each player with a pair of marked pins, and, in the manner of cribbage, it would be better to avoid confusion by providing a plurality of rows of pin holes, one for each player. Other means may also be used to mark the numerical position determined by the throw of the dice, such as a slidable tab or tabs, one for each player.

The second phase of the game comprising the forming of the colors obtained by the roll of the dice ten times into color combinations and scoring the same against the scoring chart is done in the same manner as in the previous embodiments of the game illustrated and described.

The embodiment of the game shown in Figures 6 and 7 has been purposely illustrated and described to correspond with the description of the game in Figures 1 and 2 in order to show how the principle of the design and play shown in Figures 1 and 2 may be adapted into other forms. However, it will be obvious that different variations may be made of the game illustrated in Figures 6 and 7, just as was explained could be done in connection with the game illustrated in Figures 1 and 2.

*Detailed description of Figure 8*

Figure 8 illustrates a fourth embodiment of the invention which is a joint adaptation of the game design shown in Figures 1 and 6. Here, there is provided an upright wheel 60 pivotally mounted in a pair of standards 62 which are supported on a base 64. The upright wheel has its peripheral surface shaped in the form of a wide band, and is then marked off in sequentially arranged, alternating colored areas and spaces following substantially the same pattern as those shown in Figure 6. The wheel 60 is attached to an axial shaft 66 journaled in the standard 62 and the axle is provided with a knob 68 for twirling the wheel. The standards 62 are provided with an inverted V-point 69 terminating approximately flush with the circumferential edge of the wheel. When the wheel is given a spin, and comes to rest, the color area or space opposite the point 69 is the color or space which the player notes and scores in compiling his list and score. Otherwise, the principle and method of play of the game are the same as that in Figures 1 and 6. It will likewise be appreciated, just as in the case of Figure 6, that the arrangement of colors and spaces, scoring values, etc., are illustrative only, and that various rearrangements and alterations may be made within the basic principles for the game taught by this invention. Similarly to Figure 3, Figure 8 possesses the advantage of the added attraction to the child player of motion, and will provide the kaleidoscopic effect of moving colors.

*Detailed description of Figure 9*

Figure 9 illustrates an embodiment of the invention which introduces the element of physical skill in the compilation of a list of colors. The game comprises a board 80 mounted in upright position on a pair of brace supports or feet 82. In this embodiment, the colored areas are disposed in annular rings about apertures 84 in the board and more or less randomly arranged. Scoring values are assigned to certain areas designated by certain colors or color combinations and their corresponding apertures in the same manner as was assigned to certain colored areas and spaces in Figure 1. For instance, the aperture ringed with white scores 5 points, as illustrated, and the aperture ringed with black scores a minus 5 (—5) points, as indicated. The burnt orange scoring combination for 4 points is provided by breaking the annular color ring into four segments represented by the four colors of which burnt orange is composed, to-wit: red, yellow, blue and white. The salmon pink scoring area for 3 points is provided by breaking the annular ring surrounding the aperture into three segments represented by light blue, orange and white. In similar manner, three-point scoring areas are provided for peach and maroon for three colors each.

It will thus be seen that the same scoring possibilities are provided by Figure 9 as were provided in Figure 1, and that Figure 9 is a faithful adaptation of Figure 1 in the form as modified.

The method of play in Figure 9 differs from that in Figure 1 in the following particulars. As previously noted, Figure 9 is designed to introduce the element of physical skill for selecting the colors rather than chance determining means, although, of course, in the initial period of play, before the player has gained acumen, the physical efforts themselves will be substantially a form of chance. Selection of the color areas in this game is determined by tossing or throwing some object at the board with the intention that it shall pass through one of the apertures. For instance, a bean bag or a ball may be used. If the bean bag passes through the apertures associated with the areas designated white, black, burnt orange, it scores 5 points, minus 5, or 4 points, respectively. If it passes through any of the apertures representing salmon pink, peach, or maroon, it scores 3 points, as indicated on the board. If it passes through one of the colored ringed apertures, which has no scoring value assigned to it, only the color is listed, just as the practice in playing the game illustrated in Figure 1. If the bean bag hits the solid area of the board and does not pass through an aperture, no color is obtained for the list, but the throw is counted against the ten throws permitted. The method of play and rules provided for Figure 1 are fully applicable. The only additional rules are the provision of the type of article to be thrown and the distance the player stands from the board.

Again, as in the previous embodiments, it will be appreciated that the arrangement of colored areas, selection of colors, and scoring values is illustrative only, and may be varied at will by the designer of the game. It is also desired to point out that Figure 9 suggests, as an obvious adaptation, making the board solid without the apertures and making the circular areas of different solid colors or in sectors for the complex colors. Then, the player might use darts, for instance, in compiling the list of colors. Also, the variation for Figure 9 is suggested of laying the board in the horizontal. This provides the advantage of greater facility of identifying the aperture through which the bean bag passes, because the bean bag will still be approximately in that area. If the board is close enough to the floor, the bean bag will still lie within the confines of the aperture. This method of play will avoid arguments and altercations as to the identity of the aperture through which the bag passed. When the board is solid with the circular areas being in colors, it may be laid horizontal and the colored areas selected by dropping cardboard wafers or other soft, non-resilient articles, on the board from a predetermined height, or by pitching an object on the board in the manner of pitching pennies.

Summary

It will be seen, in spite of the varied forms in which the invention may be embodied, all embodiments have in common the same three features for the complete game, to-wit: (1) a field having disposed therein a plurality of areas representing different color designations; (2) means for consecutively selecting colored areas from the field for compiling a list thereof; and (3) a scoring chart of selected color combinations having assigned scoring values. The play of the game is divided into two phases, a first phase involving either chance determining means or physical skill or dexterity methods for selecting individual colors and compiling the same in a list. The second phase of the game comprises the mental effort of combining the colors from the list into predetermined combinations shown in the color chart which have scoring values.

It will be appreciated that the game is subject to many variations in the design of the board, the principles of play, rules of the game, and scoring combinations and values. Many ancillary features may be provided, such as the matter of fractional color areas to provide additional scoring points, as illustrated and particularly described in Figures 1 and 9, and as illustrated and generally described in Figures 6 and 8. Various chance determining means may be used with any of the board designs. For instance, dice may be used with any of the designs by merely numbering the various colored areas. A whirling pointer may be used in lieu of the dice by providing a circumference broken up into a plurality of numbered segments and using the number of the segment at which the pointer comes to rest. The colored areas may be fixed as in Figures 1, 6 and 9, or may be movable by placing the same on discs or wheels as in Figures 3 and 8. Pinball machine variations may be used employing a board such as that shown in Figure 9 in the horizontal position and providing an alley disposed at one edge of the board for shooting a marble into the field. The number of variations and embodiments which may occur to persons skilled in the art are obviously capable of great numbers and all are deemed to be included within the invention so long as they embody one or more of the novel features disclosed and taught herein.

Having thus described my invention of a game and the method of playing it, what is desired to obtain by Letters Patent is:

1. An educational game for teaching the composition of complex colors comprising a field having areas of different predetermined colors, means adapted to select a plurality of said colors on said field, and a scoring chart having groups of different numbers of colors matching the colors appearing on said field and arranged in different combinations to provide options in the grouping of said selected colors to correspond to the colors in said groups on the scoring chart, each of said groups on the scoring chart including additionally the complex color formed by the combination of colors appearing in the group.

2. An educational game as defined in claim 1 in which said field of colors is disposed in a circular arrangement and said selector means comprises a rotary member pivotally mounted concentric with said field to select one of said colors by chance determination when the member is rotated.

3. An educational game as defined in claim 1 in which said field comprises a board having a plurality of targets identified by said different predetermined colors for involving the element of skill in the selection of colors.

4. An educational game for teaching the composition of complex colors comprising a field having areas of different predetermined colors, scoring values indicated on said field for certain of said colors, selector means adapted to select a plurality of said colors on said field, a scoring chart having groups of colors in different combinations matching the colors appearing on said field, each of said groups including the complex color formed by the combination of colors appearing in said group, and scoring values indicated on said chart for said groups.

5. An educational game for teaching the composition of complex colors comprising a field having areas of different predetermined colors, selector means adapted to select a plurality of said colors on said field, and a scoring chart having groups of colors in different combinations matching the colors appearing on said field, the colors in each group being arranged and designated as addends in an arithmetic problem wherein the sum of the addends is represented by the new color formed by the combination of the addend colors in the group.

6. An educational game for teaching the composition of complex colors comprising a field having areas of different predetermined colors, selector means adapted to select a plurality of said colors on said field, and a scoring chart having groups of colors in different combinations matching the colors appearing on said field to provide options in the grouping of said selected colors to correspond to said groups on the scoring chart, the colors in each group on the scoring chart being arranged as addends in a chromatic equation of addition wherein the sum of the addends is represented by the new color formed by the combination of the addend colors in the group, and scoring values indicated on said chart for said groups.

FERN A. WAKEFIELD.

References Cited in the file of this patent

UNITED STATES PATENTS

| Number | Name | Date |
|---|---|---|
| 71,374 | Ford | Nov. 26, 1867 |
| 169,085 | Cameron | Oct. 26, 1875 |
| 773,243 | Andrews | Oct. 25, 1904 |
| 804,927 | Brown | Nov. 21, 1905 |
| 935,755 | Grundy | Oct. 5, 1909 |
| 1,167,407 | Johnson | Jan. 11, 1916 |
| 1,324,382 | Buckley | Dec. 9, 1919 |
| 1,443,346 | Coble | Jan. 30, 1923 |
| 1,561,592 | Bott | Nov. 17, 1925 |
| 1,595,906 | Miller | Aug. 10, 1926 |
| 1,597,830 | Rueger | Aug. 31, 1926 |
| 1,598,899 | Vogel | Sept. 7, 1926 |
| 1,709,401 | Hermann | Apr. 16, 1929 |
| 1,714,839 | Ashburn | May 28, 1929 |
| 1,787,521 | Harrington | Jan. 6, 1931 |
| 1,799,843 | Bradford | Apr. 7, 1931 |
| 1,811,778 | Bowen | June 23, 1931 |
| 1,811,960 | Orr | June 30, 1931 |
| 1,964,586 | Leland | June 26, 1934 |
| 2,474,573 | Cohen | June 28, 1949 |